United States Patent Office 3,365,040
Patented Jan. 23, 1968

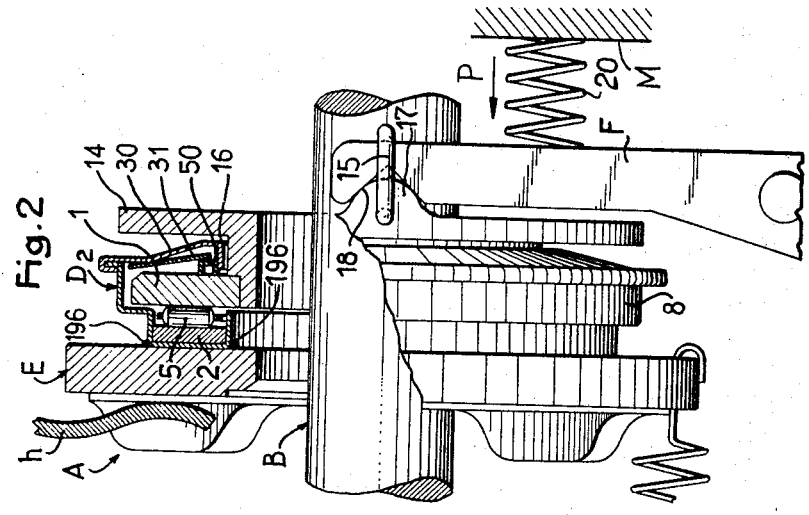
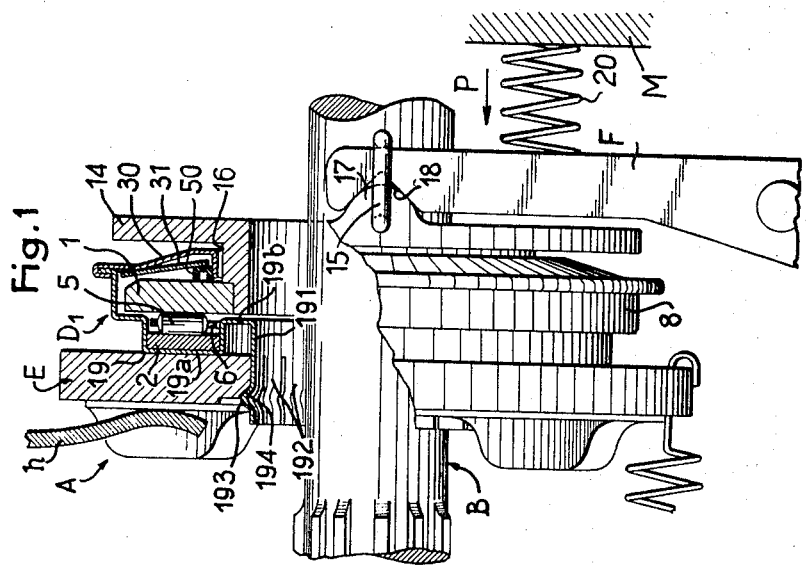

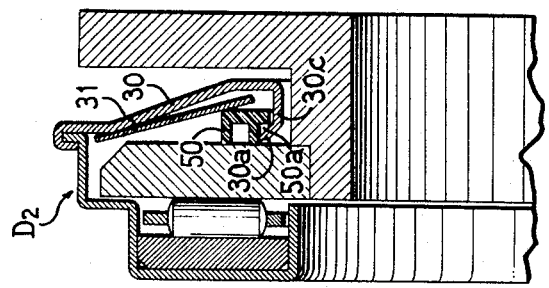
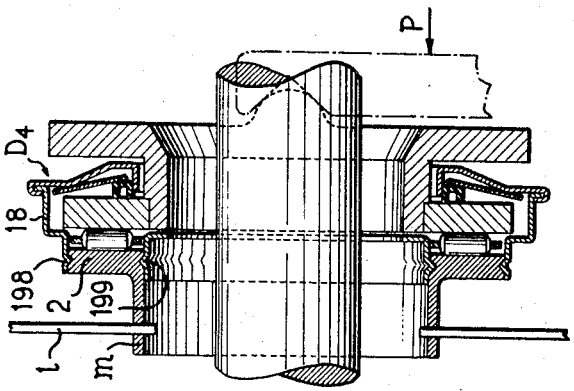
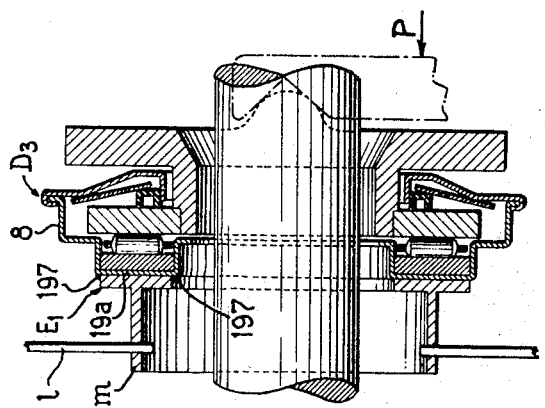

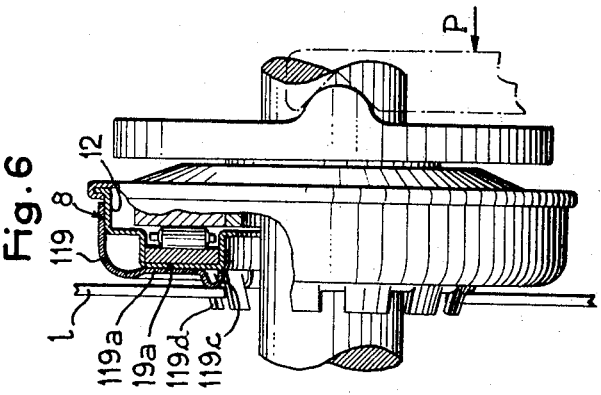
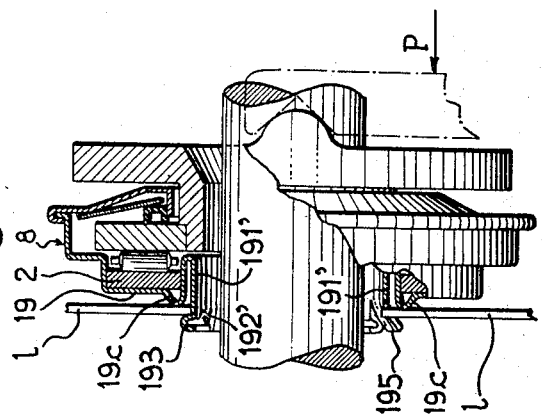

3,365,040
CLUTCH CONTROL SYSTEM
Alfred Pitner, Paris, France, assignor to S. A. Nadella, Rueil-Malmaison, Seine-et-Oise, France, a French body corporate
Filed Mar. 3, 1966, Ser. No. 531,444
Claims priority, application France, Mar. 12, 1965, 8,947
7 Claims. (Cl. 192—98)

Clutch controls have already been proposed in which there is a permanent contact between the thrust bearing controlling the clutch mechanism and this mechanism so as to eliminate the lost motion of the clutch pedal corresponding to the usual clearance or "guard" between the thrust bearing and the mechanism. This is advantageous, since this clearance corresponds to a long travel of the pedal, in respect of which the forces to exert serve exclusively to overcome friction and the return spring but which usually results in an inconvenient position of the pedal owing to an ever-increasing mechanical advantage employed in the linkage connecting the pedal to the thrust bearing.

Elimination of this clearance results in a permanent contact between the clutch control thrust bearing and a part of this clutch—namely the attached plate, or the control levers or diaphragm—under a controlled, and usually small, axial force.

This arrangement results in several drawbacks

If it is desired to employ a normally self-lubricating smooth or sliding thrust bearing, for example consisting of a graphite ring, a relatively economical or "carrier" assembly can be employed, the thrust bearing describing an arc of a circle corresponding to the movement of the pivotal fork which carries this thrust bearing. However, rapid wear results.

If it is desired to employ a rolling thrust bearing, consisting of a thrust ball bearing or a journal ball bearing having deep grooves, rapid wear is avoided, on condition, however, that the economical "carried thrust bearing" is replaced by a "guided thrust bearing" the thrust bearing being guided by a cylindrical support sliding on cylindrical guide so as to afford a rectilinear path centered as carefully as possible relative to the clutch mechanism. This results in a very high cost price.

Employing a needle bearing under the same conditions has roughly the same drawbacks.

Whether the bearing is of the ball or needle type, it is also necessary that the pressure of contact be relatively high to take into account: either the consistency of the lubricant in cold weather, when the sealing system is constructed in a simple manner with labyrinths or baffles which do not afford a very great seal for relatively fluid lubricants, or possibly the utilization of a positive seal to improve the sealing properties and employ a more fluid lubricant which ensures an improved lubrication.

The object of the invention is to provide a clutch control system devoid of the aforementioned drawbacks in which the control thrust bearing comprises needles or rollers guided between two rolling plates which are relatively movable, one of said plates being fixed to a rotatable element of the clutch mechanism so as to be positively centered and driven thereby.

This arrangement ensures a positive contact between the rotatable plate of the thrust bearing and the clutch mechanism. An effective centering is also obtained by construction instead of by a self-centering effect.

Further, by connection the rotatable part of the thrust bearing to the adjacent element of the clutch element, the axial force, which is constant during operation in the engaged clutch position, can be reduced to that which is just sufficient to compensate the friction of the rolling of the needles, which is advantageous in respect of both operation and the life of the whole of the clutch and the life of the bearing. The sliding friction forces of the sealing device is manifested by a torque directly balanced by a torque furnished by the engine through the clutch system and the connection of the rotatable part of the thrust bearing to this mechanism.

Consequently, there is no inconvenience in employing sealing means having an improved efficiency which creates a relatively high friction, such as those disclosed in the French Patents 1,249,807 and 74,445 and the French patent applications 956,940 and 982,745 permitting the utilization of a relatively fluid lubricant so as to facilitate the rotation of the rolling elements and limit the axial force necessary for driving them. The friction of the improved sealing device is thus limited by considerations of the heat generated and not the axial force.

Another advantage of the clutch control system of the invention is that it reduces, if desired, the number of parts, owing to the connection between the thrust bearing and the mechanism and thus reduces the cost price.

For the purpose of avoiding the concentration of forces on the thrust bearing and in particular for eliminating the internal forces on the thrust bearing due to a possible bad parallelism between the thrust bearing and the clutch mechanism, it is possible in accordance with the invention to adopt an arrangement described in the French patent application 974,476 which comprises mounting the thrust bearing on the pivotal fork, or the latter on the support, through a ball and socket or "universal" joint, that is, a joint allowing a relative freedom of movement between the general plane of the thrust bearing—which is substantially perpendicular to the axis of rotation—and said axis of rotation so as to avoid possible stresses on the sealing device interposed between the rotating and fixed parts of the thrust bearing which are respectively connected to the clutch mechanism and the fork, the ball and socket or universal joint being so disposed as to avoid any transverse displacement relative to the axis of rotation.

Further features and advantages of the invention will be apparent from the ensuing description with reference to the accompanying drawings to which the invention is in no way limited.

In the drawings:

FIG. 1 is a partial view of a clutch control system according to the invention comprising a lever-type clutch disengaging mechanism;

FIG. 2 is a view of a variant of the system shown in FIG. 1;

FIGS. 3 and 4 are views of two embodiments of a clutch control system, the clutch engaging mechanism of which includes a diaphragm;

FIGS. 5 and 6 are views of variants in which there is no plate between the thrust bearing and clutch mechanism, and FIG. 7 is a view on an enlarged scale showing a feature of the clutch thrust bearing sealing means according to the invention.

The clutch system partly shown in FIG. 1 comprises a clutch mechanism A adapted to disengage a driving shaft (not shown) from a driven shaft B under the effect of a thrust exerted towards the left (as viewed in FIG. 1) by a pivotal fork F which acts through a thrust needle bearing $D_1$ carried by said fork.

The thrust bearing $D_1$ is, on the whole, in conformity with the thrust bearing disclosed in the patent application filed on Dec. 12, 1963, under No. 956,940 for "Improvements in Clutch Thrust Bearings." It comprises two rolling plates 1, 2 between which is inserted a cage 6 for needles 5 and which are respectively connected to a plate 14 constituting a hub 14 and to a lubricant housing of which one radial wall 30 is inserted in a sealed manner in the recess 16 formed between the rolling plate 1 and the plate 14. The other radial wall 19 comprises a middle portion 19a on the inner face of which is secured the rolling plate 2, and a portion 19b which is offset towards said plate, a clearance being provided between the portion 19b and said plate.

According to the invention, this radial portion 19b extends alongside the axis of rotation and forms a cylindrical wall 191 fixed in the centre opening of the plate E of the clutch mechanism carried by the clutch release levers h and bearing against the outer face of the middle portion 19a of the housing 8. In the illustrated embodiment, the rigid connection between the plate E and the cylindrical wall 191 is achieved by means of projections 193 formed in tongues or tabs 192 of the wall and engaged in the complementary annular region 194 formed in the end of the opening of the plate E adjacent the levers h.

The illustrated position is a normal engaged-clutch position in which a slight permanent axial thrust P exerted by the fork F under the effect of, for example, a spring 20 bearing against the support M, ensures a continuous circulation of the needles 5 in contact with the plate 1 which is stationary as concerns rotation and the plate 2 which rotates with the plate E and the housing 8. The radial wall 30 of the latter applies, through an elastically yieldable washer 31, the sealing ring 50 in sliding contact with the adjacent face of the rolling plate 1.

When releasing the clutch, as a result of increased pressure exerted by the fork F owing to a pressure exerted on the clutch pedal, the non-rotatable part 14, 1 of the thrust bearing $D_1$ moves through a curved path which shifts the rolling plate 1 radially of the plate 2 which rotates with the clutch-actuating plate E. This radial displacement is allowed by the radial clearance (visible in the drawing) between the peripheral edge of the plate 1 and the adjacent cylindrical portion of the housing 8.

In the embodiment shown in FIG. 2, the radial wall 19, instead of being fixed by a cylindrical wall in the centre opening of the plate E, is fixed directly to the plate E by welding 196, or like means, which interconnects the outer face of the radial portion 19a and the adjacent face of the plate E.

FIG. 3 shows a clutch mechanism in which the clutch-actuating plate $E_1$ is integral with a cylindrical collar m in which is retained the inner edge of a diaphragm l of the clutch. According to the invention, the outer face of the middle radial portion 19a of the housing 8 is secured by welding 197 to the adjacent face of the plate $E_1$.

In the embodiment shown in FIG. 4, the clutch-release or actuating plate $E_1$ is in one integral piece with the rolling plate 2 and the housing 8, which is consequently modified, comprises two independent members 198, 199 inserted or deformed into the respective circular edges of the plate 2.

FIG. 5 shows a clutch control mechanism corresponding to a diaphragm clutch in which no plate $E_1$ is employed and the radial wall 19 of the housing 8 of the thrust bearing has—as described in the French patent application 974,476, filed on May 14, 1964, and entitled "Clutch System Comprising a Thrust Needle or Roller Bearing"—an annular projection 19c which bears directly against the strips l of the diaphragm. The wall 19 has, as in the embodiment shown in FIG. 1, a cylindrical portion 191' which is extended by tongues or tabs 192' having alternately projections 193, axially retaining the thrust bearing relative to the diaphragm, and offset portions 195 inserted between the strips l and thus interconnecting the housing and the diaphragm so that they rotate together. The centering of the housing, with respect to the diaphragm, is ensured either together or separately by, on one hand, the fact that the tabs 192' with their projections 193 bear against the inner ends of the strips l and, on the other hand, the offset portions 195 (at least three in number angularly spaced 120° apart) between the strips l.

In the embodiment shown in FIG. 6, the thrust bearing employed is of the type described hereinbefore, the housing having merely a plane face 19a and the thrust bearing being copped by a member 119 having the following features:

(a) It is centered by its outer portion on the cylindrical portion 12 of the housing 8.

(b) It has a bearing portion 119a substantially limited to the region corresponding to the mean diameter of the path of movement of the needles.

(c) It has a projection 119c of generally toric shape adapted to bear against the strips l of the diaphragm.

(d) At least three tabs 119d, angularly spaced 120° apart, are inserted between the strips of the diaphragm so as to center the assembly. In this case, no particular precaution is taken as concerns axially retaining the whole of the thrust bearing relative to the diaphragm, bearing in mind, as explained at the beginning of this description, that a continuous pressure is exerted on the control fork so as to ensure a permanent contact between the thrust bearing and the clutch mechanism.

FIG. 7 shows a constructional detail of the sealing device of the thrust bearing in which the ring 50 is connected to rotate with the radial wall 30 of the housing 8, owing to the provision of bent tabs 30a formed on the free edge or flange 30c of the wall 30 and engaged in recesses 50a in the ring 50 whose axial extent, of course, allows slight axial movements of the ring 50 necessary to take up wear of the active lips of this ring under the action of the spring 31.

Although specific embodiments of the invention have been described, many modifications and changes may be made therein without departing from the scope of the invention as defined in the appended claims.

Thus instead of an assembly of the plate 14 on the fork F by means of a simple pivotal connection achieved as shown in FIG. 1 by means of two part-cylindrical bosses 17 formed on the plate 14 and maintained in contact with the flanks of a V-shaped recess 18 by springs 15 of the "tweezers" type (FIG. 1), there could be provided an assembly by means of a ball and socket or universal joint which allows a certain freedom of movement of the thrust bearing about a secondary axis perpendicular to the normal pivot axis of the fork in accordance with an arrangement described in the French patent application 974,476, filed on May 14, 1964, for "Clutch System Comprising a Thrust Needle or Roller Bearing."

In a general way, the clutch system according to the present invention could be modified or completed by the utilization of arrangements described not only in the aforementioned patent application but also in the French Patent 1,249,807 (filed on July 8, 1957), the Addition 74,445 to the preceding patent (filed on June 16, 1958), the French Patent 1,378,120 (filed on Sept. 10, 1964) and the French patent applications 956,940 (filed on Dec. 12, 1963) and 982,745 (filed on July 23, 1964).

Having now described my invention what I claim as new and desire to secure by Letters Patent is:

1. Clutch control system for actuating a clutch mechanism having a rotatable element, said system comprising a thrust bearing comprising rolling members, two rolling plates capable of moving radially with respect to each other, said rolling members being guided between said rolling plates, one of said rolling plates being fixed to said rotatable element in such manner as to be positively centered and driven thereby.

2. Clutch control system as claimed in claim 1, comprising a housing having a radially extending face permanently fixed to the adjacent face of said rotatable element, said rolling plate connected to said rotatable element being fixed in said housing.

3. Clutch control system as claimed in claim 1, comprising a housing having a radially extending face fixed in a precarious manner to the adjacent face of said rotatable element, said rolling plate connected to said rotatable element being fixed in said housing.

4. Clutch control system as claimed in claim 1, wherein said one of said rolling plates is constituted by a face of said rotatable element, a portion of said rotatable element forming an integral part of a housing.

5. Clutch control system as claimed in claim 1, comprising a housing having a radially extending face including an annular projection which bears directly on said clutch mechanism, without a clutch actuating plate, additional elements fixing in a precarious manner to the adjacent parts of said mechanism, said rolling plate connected to said rotatable element being fixed in said housing.

6. Clutch control system as claimed in claim 1, comprising a housing, an intermediate element including an annular portion bearing directly on the clutch mechanism and at least three extension portions penetrating said mechanism and centering the thrust bearing, said housing being secured inside said intermediate element and said rolling plate connected to said rotatable element being fixed inside said housing.

7. Clutch control system as claimed in claim 1, wherein the rolling plate other than said rolling plate connected to said rotatable element is non-rotatable and a ring for sealing the housing is applied against the nonrotatable rolling plate in such manner as to rotate therewith.

References Cited
UNITED STATES PATENTS 2,359,364   10/1944   Katcher _____ 192—98
2,995,406   8/1961    Pitner _____ 308—234

DONLEY J. STOCKING, *Primary Examiner.*

ARTHUR T. McKEON, *Examiner.*

UNITED STATES PATENT OFFICE
CERTIFICATE OF CORRECTION

Patent No. 3,365,040　　　　　　　　　Dated January 23, 1968

Inventor(s) Alfred Pitner

It is certified that error appears in the above-identified patent and that said Letters Patent are hereby corrected as shown below:

In the heading to the printed specification, line 3, "assignor to S. A. Nadella" should read -- assignor of one-half to Nadella S. A. --.

Signed and sealed this 3rd day of November 1970.

(SEAL)
Attest:

EDWARD M. FLETCHER, JR.　　　　　　　WILLIAM E. SCHUYLER, JR.
Attesting Officer　　　　　　　　　　Commissioner of Patents